US010644451B2

(12) United States Patent
Mann et al.

(10) Patent No.: US 10,644,451 B2
(45) **Date of Patent: *May 5, 2020**

(54) DYNAMIC KEYING ASSEMBLY

(71) Applicant: International Business Machines Corporation, Armonk, NY (US)

(72) Inventors: Phillip V. Mann, Rochester, MN (US); Mark D. Plucinski, Rochester, MN (US); Sandra J. Shirk/Heath, Rochester, MN (US); Arvind K. Sinha, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,788

(22) Filed: Dec. 5, 2017

(65) Prior Publication Data

US 2018/0097329 A1 Apr. 5, 2018

Related U.S. Application Data

(63) Continuation of application No. 14/277,961, filed on May 15, 2014, now Pat. No. 9,954,338, which is a (Continued)

(51) Int. Cl.
*H01R 13/64* (2006.01)
*H01R 13/70* (2006.01)
(Continued)

(52) U.S. Cl.
CPC ........... *H01R 13/64* (2013.01); *H01R 13/665* (2013.01); *H01R 13/70* (2013.01); *H01R 43/26* (2013.01); *H01R 13/447* (2013.01)

(58) Field of Classification Search
CPC .. H01R 13/64; H01R 13/665; H01R 13/6658; H01R 13/6683; H01R 13/6691; H01R 13/44; H01R 13/6397; H01R 13/70
See application file for complete search history.

(56) References Cited

U.S. PATENT DOCUMENTS

| | | | |
|---|---|---|---|
| 3,023,394 | A | 2/1962 | Hubbell |
| 3,085,221 | A | 4/1963 | Kelly |

(Continued)

OTHER PUBLICATIONS

IBM, et al., "Connection Alignment Pin with Selectable Key," IP.com Prior Art Database Technical Disclosure. Original Publication Date Jul. 1, 1972. IP.com Electronic Publication Date Feb. 25, 2005. IP.com No. IPCOM000077399D.

(Continued)

*Primary Examiner* — Livius R. Cazan
(74) *Attorney, Agent, or Firm* — Brian D. Welle

(57) ABSTRACT

A method and system for a dynamic keying system is disclosed. The method and system can include a male connector device having a first plurality of settings for one or more key features, and a female connector device having a second plurality of settings for one or more key features. The female connector device can be configured to operate in an initial mode in which it is configured to, in response to the introduction of the male connector device, correspond a first setting of the first plurality of settings to a second setting of the second plurality of settings. The female connector device can also be configured to operate in a subsequent mode, in which it can permit coupling with at least one male connector device having the first setting and consistently deny access to at least one male connector device having a third setting different than the first setting.

6 Claims, 9 Drawing Sheets

Related U.S. Application Data continuation of application No. 14/162,973, filed on Jan. 24, 2014, now Pat. No. 9,843,152.

(51) Int. Cl.

| | |
|---|---|
| ***H01R 13/66*** | (2006.01) |
| ***H01R 43/26*** | (2006.01) |
| *H01R 13/447* | (2006.01) |

(56) References Cited

U.S. PATENT DOCUMENTS

| | | | | |
|---|---|---|---|---|
| 3,177,462 | A | 4/1965 | Sammark | |
| 3,491,330 | A | 1/1970 | Barnhart et al. | |
| 3,566,340 | A | 2/1971 | Jayne | |
| 3,971,609 | A | 7/1976 | Knecht | |
| 4,077,693 | A | 3/1978 | Briel, Jr. et al. | |
| 4,159,862 | A | 7/1979 | Funck et al. | |
| 4,764,129 | A | 8/1988 | Jones et al. | |
| 5,254,019 | A | 10/1993 | Noschese | |
| 5,273,462 | A | 12/1993 | Huser et al. | |
| 5,370,548 | A | 12/1994 | Laudereau | |
| 5,688,147 | A | 11/1997 | Coteus et al. | |
| 5,930,496 | A | 7/1999 | MacLaren et al. | |
| 6,302,745 | B1 | 10/2001 | Landis et al. | |
| 6,701,400 | B2 | 3/2004 | Hayes et al. | |
| 7,666,028 | B2 | 2/2010 | Meleck | |
| 8,075,350 | B2 | 12/2011 | Heggemann et al. | |
| 2006/0002690 | A1 * | 1/2006 | Stwertka .............. | G03B 21/321 386/200 |
| 2011/0207347 | A1 * | 8/2011 | Tsuruta .................. | H01R 13/44 439/133 |

OTHER PUBLICATIONS

Mann, P., et al., Dynamic Keying Assembly, U.S. Appl. No. 14/162,973, filed Jan. 24, 2014.

Mann et al., "Dynamic Keying Assembly," U.S. Appl. No. 14/277,961, filed May 15, 2014.

Mann et al., "Dynamic Keying Assembly," U.S. Appl. No. 15/831,804, filed Dec. 5, 2017.

* cited by examiner

DYNAMIC KEYING ASSEMBLY

RELATED APPLICATIONS

This application is a continuation of U.S. application Ser. No. 14/277,961 filed Jan. 24, 2014, now allowed, which is a continuation of U.S. application Ser. No. 14/162,973, filed May 14, 2014, both of which are incorporated herein in their entirety.

FIELD OF THE INVENTION

The present disclosure generally relates to a connector assembly. In particular, it relates to a connector assembly for providing a dynamic keying system.

BACKGROUND

The number of cable connections necessary to facilitate functionality of electronic systems is steadily increasing. Individualized connector assemblies are one tool that can be used to manage cable connections of electronic systems. As the number of cable connections increases, the need for managing cable connections may also increase.

SUMMARY

Aspects of the present disclosure are directed to a dynamic keying system, and methods of using, that address challenges including those discussed herein, and that are applicable to a variety of applications. These and other aspects of the present invention are exemplified in a number of implementations and applications, some of which are shown in the figures and characterized in the claims section that follows.

Aspects of the present disclosure, in certain embodiments, are directed toward a connector assembly for facilitating a dynamic keying system. In certain embodiments, the dynamic keying system can include a male connector device having a first plurality of settings for one or more key features. The dynamic keying system can also include a female connector device having a second plurality of settings for one or more key features. Consistent with various embodiments, the female connector device can be configured to operate in an initial mode and a subsequent mode. When in the initial mode, the female connector device can be configured to, in response to the introduction of the male connector device, correspond a first setting of the first plurality of settings to a second setting of the second plurality of settings. When in the subsequent mode, the female connector device can be configured to permit coupling with at least one male connector device having the first setting and consistently deny access to at least one male connector device having a third setting different than the first setting.

Aspects of the present disclosure, in certain embodiments, are directed toward a method for assembling a dynamic keying system. In certain embodiments, the method can include structuring a male connector device to have a first plurality of settings for one or more key features. In certain embodiments, the method can also include structuring a female connector device to have a second plurality of settings for one or more key features, and configured to operate in an initial mode and a subsequent mode. When in the initial mode, the female connector device can be configured to, in response to the introduction of the male connector device, correspond a first setting of the first plurality of settings to a second setting of the second plurality of settings. When in the subsequent mode, the female connector device can be configured to permit coupling with at least one male connector device having the first setting and consistently deny access to at least one male connector device having a third setting different than the first setting.

Aspects of the present disclosure, in certain embodiments, are directed toward a connector assembly for facilitating a dynamic keying system. In certain embodiments, the dynamic keying system can include a male connector device having a first plurality of settings for one or more ridges protruding from the male connector device. The ridges can be physically adjustable in a plane relative to the male connector device. The dynamic keying system can also include a female connector device having a second plurality of settings for a receptacle located within the female connector device. Consistent with various embodiments, the female connector device can be configured to operate in an initial mode and a subsequent mode. When in the initial mode, the receptacle can be substantially deformable, and the female connector device can be configured to, in response to the introduction of the male connector device, correspond a first setting of the first plurality of settings to a second setting of the second plurality of settings. When in the subsequent mode, the receptacle can be substantially non-deformable, and the female connector device can be configured to permit coupling with at least one male connector device having the first setting and consistently deny access to at least one male connector device having a third setting different than the first setting.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1A:
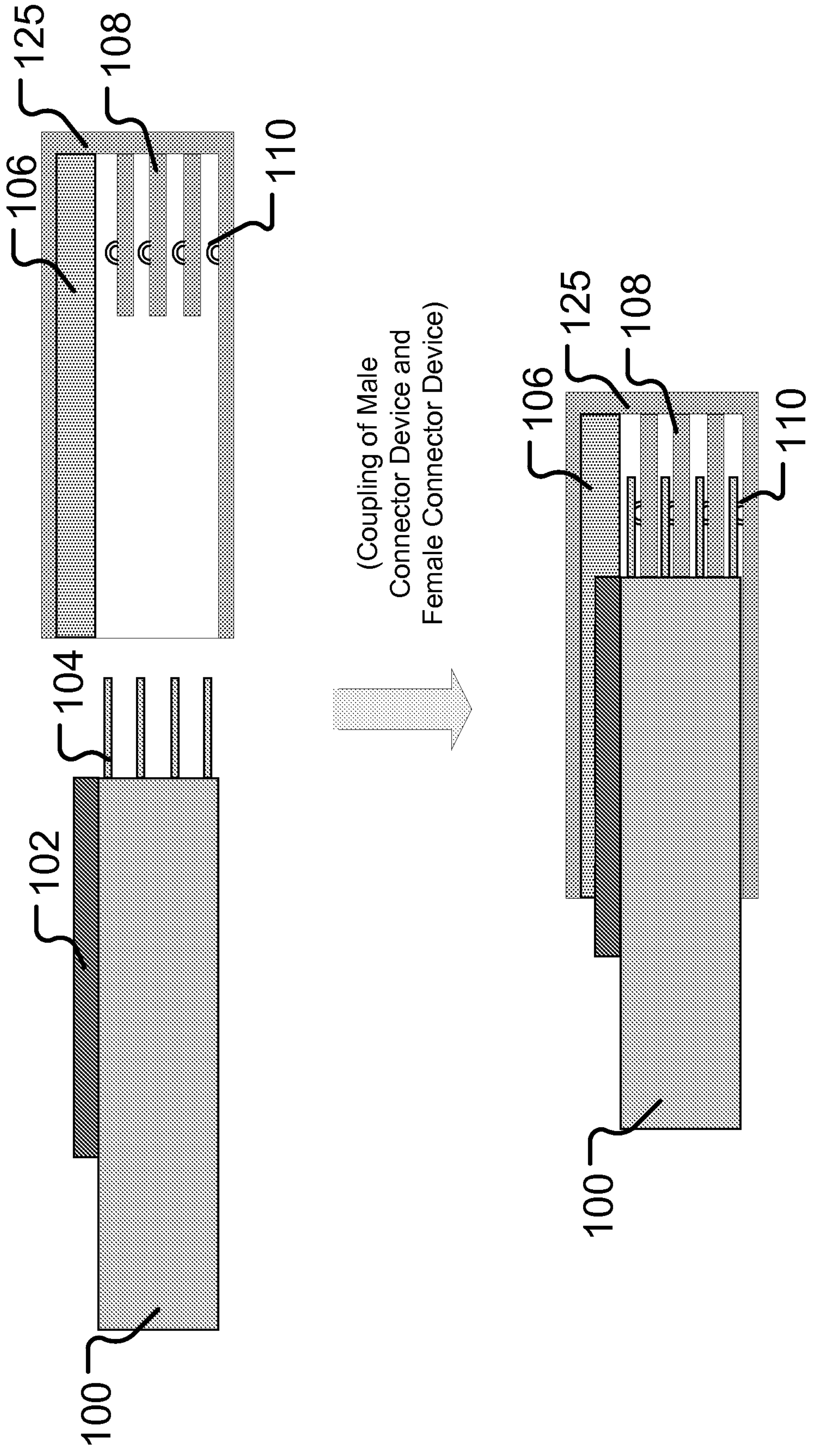
FIG. 1A shows a side view of a male connector device with an adjustable-height key feature and a female connector device of the dynamic keying system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments and methods of a system for dynamic keying. The system can include a connector assembly having a male connector device and a female connector device, the male connector device configured to couple with the female connector device. The male connector device and the female connector device can include one or more key features configurable in one or more settings prior to coupling. Upon coupling, the female connector device can correspond to the current key feature settings and lock into a subsequent position. In the subsequent position, the female connector device can be configured to permit coupling with at least one male connector device having the current setting, and deny access to at least one male connector device having a different setting than the current setting. While the present invention is not necessarily limited to such applications, various aspects of the invention may be appreciated through a discussion of various examples using this context.

Aspects of the present disclosure relate to the recognition that, in certain situations, connection of related electronic units can require the use of identical connectors, which can lead to mistaken interconnection between electronic units. Such mishaps can go unnoticed, resulting in impacts on efficiency and productivity, as well as creating potentially unsafe environments due to electrical hazards. Further, although labeling of each individual electrical unit can help alleviate such difficulties, this approach can be time consuming, and electrical units may be incorrectly labeled. Accordingly, aspects of the present disclosure relate to a method and system for a connector assembly for dynamic keying that can facilitate individualized keying between male and female connector devices. The present disclosure may provide benefits associated with simplified pairing of electronic connector devices.

Aspects of the present disclosure include a method and system for dynamic keying. The method and system can include a male connector device having a first plurality of settings for one or more key features, and a female connector device having a second plurality of settings for one or more key features. The female connector device can be configured to operate in an initial mode and a subsequent mode. In the initial mode, in response to the introduction of the male connector device, the female connector device can correspond a first setting of the first plurality of settings to a second setting of the second plurality of settings. In the subsequent mode, the female connector device can be configured to permit coupling with at least one male connector device having the current setting, and deny access to at least one male connector device having a setting different than the current setting.

Turning now to the figures, FIG. 1A shows a side view of the male connector device and the female connector device of the dynamic keying system, consistent with embodiments of the present disclosure. Aspects of FIG. 1A are directed toward a dynamic keying system with a male connector device 100 and a female connector device 125 that can include one or more key features 102, 106 configurable in one or more settings prior to coupling. Upon coupling, the female connector device 125 can correspond to the current key feature setting of the male connector device 100 and lock into a secure position. Consistent with various embodiments, the dynamic keying system can also include one or more connecting members 104. In certain embodiments, the connecting members 102 can include electrical pins; however, other connecting members are possible, including but not necessarily limited to plugs, prongs, and wires. Other shapes and connecting member types are also possible. In certain embodiments, the connecting members 102 can be configured to interface with one or more electrical contacts 110.

Aspects of the present disclosure may be used for a variety of connector systems in which the insertion of a male connector device interfaces with a female connector device. Further, aspects of the present disclosure can allow for more than one male connector device to couple with a female connector device.

Consistent with various embodiments, the electrical contacts 110 can be located on a support surface 108. In certain embodiments, the support surface 108 can be part of a scaffold structure with parallel arms, each upholding at least one electrical contact 110. In certain embodiments, the support surface 108 can be attached to one or more walls of the female connector device 125. For example, the scaffold structure can be affixed to the side walls of the female connector device 125 such that it guides the connecting members 104 to the electrical contacts 110 when a male connector device 100 interfaces with the female connector device 125.

In certain embodiments, the male connector device 100 and the female connector device 125 can include one or more key features, 102, 106. The key features can be individually configured in one of a plurality of settings before initial coupling of the male connector device 100 and the female connector device 125. For example, in certain embodiments, the key feature 102 can be configured in a first setting prior to coupling of the male connector device 100 and the female connector device 125. Upon initial coupling, the female connector device 125 can correspond to the first key feature setting of the male connector device 100 and lock into the subsequent position. The key features 102, 106 can be one of a number of designs. For example, in certain embodiments, the key feature 102 can be a ridge architecture located on the male connector device 100, and the key feature 106 can be a deformable material located within the female connector device 125.

Figure 1B:
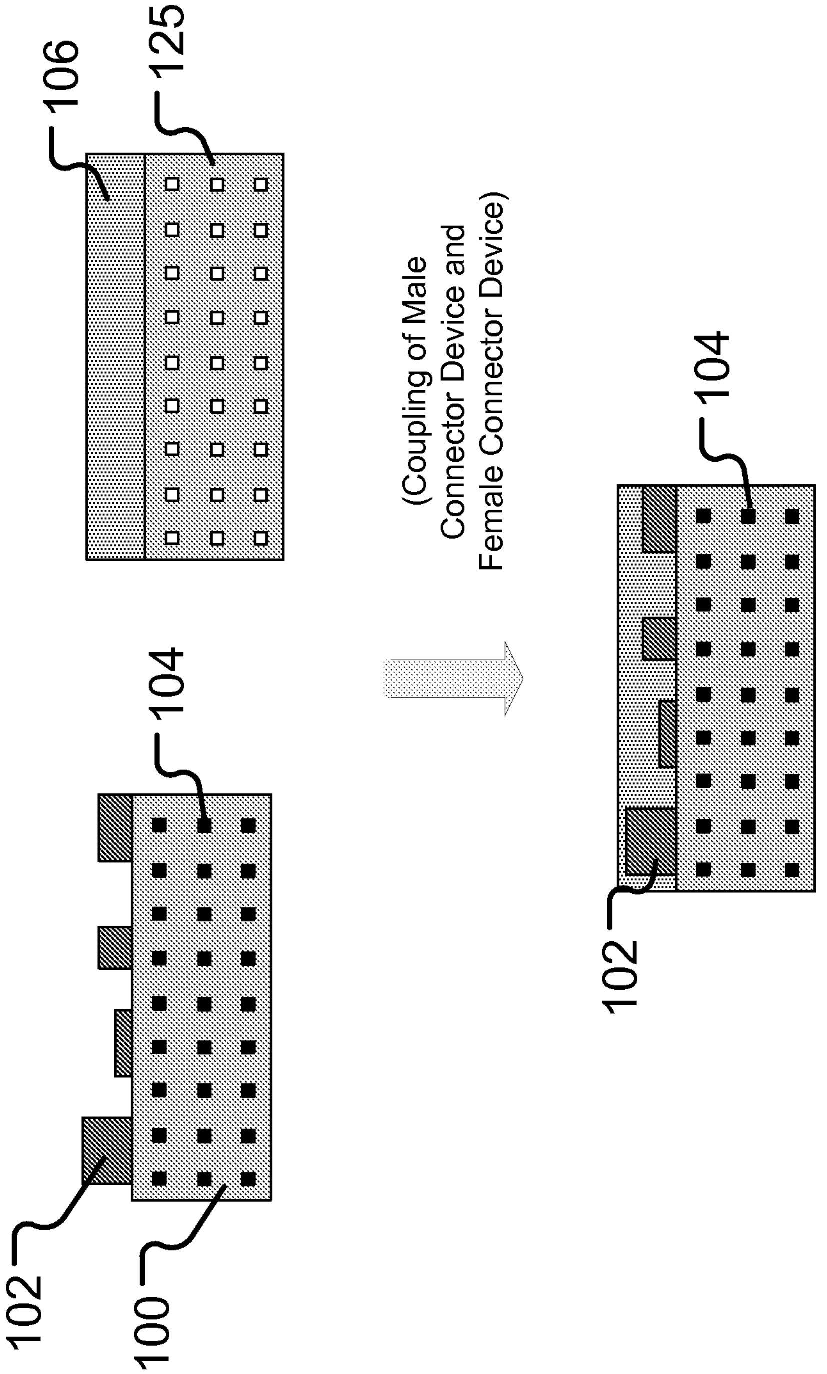
FIG. 1B shows a front view of a male connector device with an adjustable-height key feature and a female connector device of the dynamic keying system, consistent with embodiments of the present disclosure.

FIG. 1B shows a front view of the male connector device 100 and the female connector device 125 of the dynamic keying system, consistent with embodiments of the present disclosure. Aspects of FIG. 1B are directed toward a dynamic keying system with one or more key features 102, 106 including a ridge architecture with adjustable height and a deformable material to facilitate keying between the male connector device 100 and the female connector device 125.

As shown in FIG. 1B, the key feature 102 can include a ridge architecture with one or more ridges extending from the male connector device 100. Although the key feature 102 is depicted as having four ridges in FIG. 1B for simplicity, other configurations are also possible. Consistent with various embodiments, the ridge architecture can be configured in one of a plurality of settings. For example, in certain embodiments, each ridge can be configured to extend and retract relative to the male connector device 100, thereby altering the height of each ridge. In certain embodiments, each ridge can be adjusted to a certain height and locked in position to prevent accidental adjustment. Prior to initial coupling with the female connector device 125, the ridge architecture can be configured in a first setting.

Consistent with various embodiments, the key feature 106 can include a deformable material located within the female connector device 125. In certain embodiments, the deformable material can be substantially deformable prior to initial coupling with the male connector device 100, and substantially non-deformable after initial coupling. For instance, the deformable material could respond to a change in environmental conditions, such as exposure to air, a change in temperature, exposure to ultraviolet light, or an electrical current. For example, in certain embodiments, upon initial coupling of the male connector device 100 and the female connector device 125, the deformable material can conform to the first setting of the ridge architecture and solidify. Such a configuration could allow for coupling and decoupling between the female connector device 125 and a male connector device 100 configured in the first setting.

Consistent with various embodiments, the deformable material can be one of a number of different materials. For example, in certain embodiments, the deformable material can include epoxy, clay, thermoplastic resins, thermoplastic polymers, thermoset resins and thermoset polymers. More particularly, the deformable material can include polyester resin, vinyl ester resin, phenolic, and urethane. In certain embodiments, a combination of various materials may be utilized. Consistent with various embodiments, the deformable material can be substantially deformable prior to initial coupling with the male connector device 100, and substantially non-deformable after initial coupling.

Figure 2:
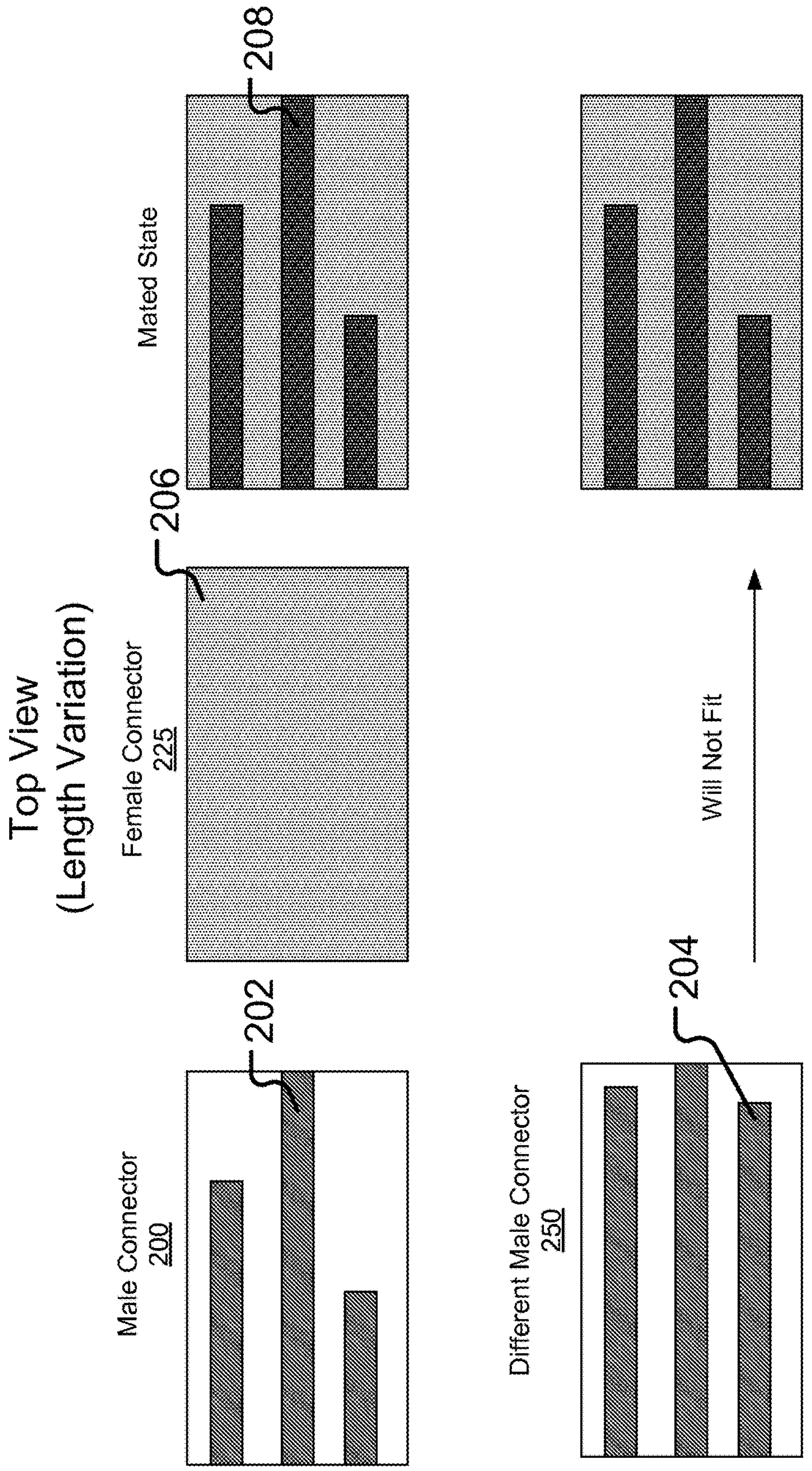
FIG. 2 shows a top view of a male connector device with an adjustable-length key feature and a female connector device of the dynamic keying system, consistent with embodiments of the present disclosure.

FIG. 2 shows a top view of the male connector device and the female connector device of the dynamic keying system, consistent with embodiments of the present disclosure. Aspects of FIG. 2 are directed toward a dynamic keying system with one or more key features 202, 206 including a ridge architecture having one or more ridges with adjustable length and a deformable material to facilitate keying between the male connector device 200 and the female connector device 225.

As shown in FIG. 2, the dynamic keying system can include a male connector device 200 and a female connector device 225. Consistent with various embodiments, the male connector device 200 can include a key feature 202, and the female connector device can include a key feature 206. For example, in certain embodiments, the key feature 202 can be a ridge architecture including one or more ridges, and the key feature 206 can be a deformable material. Consistent with various embodiments, the length of the individual ridges of the ridge architecture can be independently adjusted. For example, in certain embodiments, one ridge of the male connector device 202 can be adjusted to a greater length relative to one or more other ridges. In certain embodiments, the deformable material can be substantially deformable prior to initial coupling with the male connector device 200, and substantially non-deformable after initial coupling with the male connector device 200.

Consistent with various embodiments, upon initial coupling of the male connector device 200 and the female connector device 225, the deformable material can conform to the first setting of the ridge architecture and solidify. For example, the deformable material can conform to the shape and dimensions of the ridges, thereby forming one or more grooves 208 in the deformable material of the female connector device 225. Such a configuration could allow for coupling and decoupling between the female connector device 225 and a male connector device 200 configured in the first setting. As shown in FIG. 2, in certain embodiments, a different male connector device 250 configured in a setting other than the first setting can be prevented from interfacing with the female connector device 225. For example, as shown in FIG. 2, a different ridge 204 of the different male connector device 250 may be too long to enter a groove 208 of the female device 225.

Figure 3:
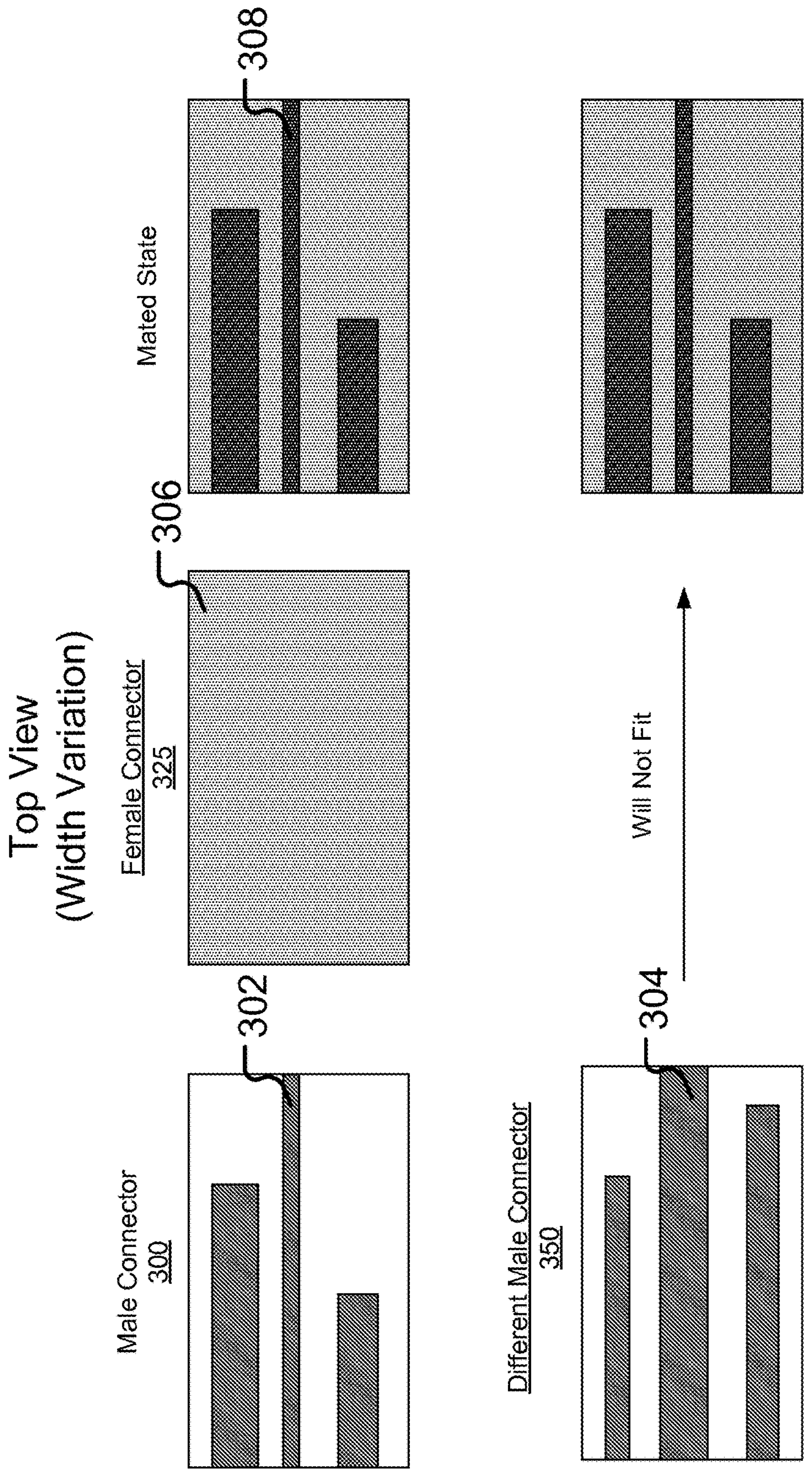
FIG. 3 shows a top view of a male connector device with an adjustable-width key feature and a female connector device of the dynamic keying system, consistent with embodiments of the present disclosure.

FIG. 3 shows a top view of the male connector device and the female connector device of the dynamic keying system, consistent with embodiments of the present disclosure. Aspects of FIG. 3 are directed toward a dynamic keying system with one or more key features 302, 306 including a ridge architecture having one or more ridges with adjustable width and a deformable material to facilitate keying between the male connector device 300 and the female connector device 325.

As shown in FIG. 3, the dynamic keying system can include a male connector device 300 and a female connector device 325. Consistent with various embodiments, the male connector device 300 can include a key feature 302, and the female connector device can include a key feature 306. For example, in certain embodiments, the key feature 302 can be a ridge architecture including one or more ridges, and the key feature 306 can be a deformable material. Consistent with various embodiments, the width of the individual ridges of the ridge architecture can be independently adjusted. For example, in certain embodiments, one ridge of the male connector device 302 can be adjusted to a greater width relative to one or more other ridges. In certain embodiments, the deformable material can be substantially deformable prior to initial coupling with the male connector device 300, and substantially non-deformable after initial coupling with the male connector device 300.

Consistent with various embodiments, upon initial coupling of the male connector device 300 and the female connector device 325, the deformable material can conform to the first setting of the ridge architecture and solidify. For example, the deformable material can conform to the shape and dimensions of the ridges, thereby forming one or more grooves 308 in the deformable material of the female connector device 225. Such a configuration could allow for coupling and decoupling between the female connector device 325 and a male connector device 300 configured in the first setting. As shown in FIG. 3, in certain embodiments, a different male connector device 350 configured in a setting other than the first setting can be prevented from interfacing with the female connector device 325. For example, one or more of the ridges of the different male connector device 350 can be too wide to enter a groove 308 of the female connector device 325.

Figure 4:
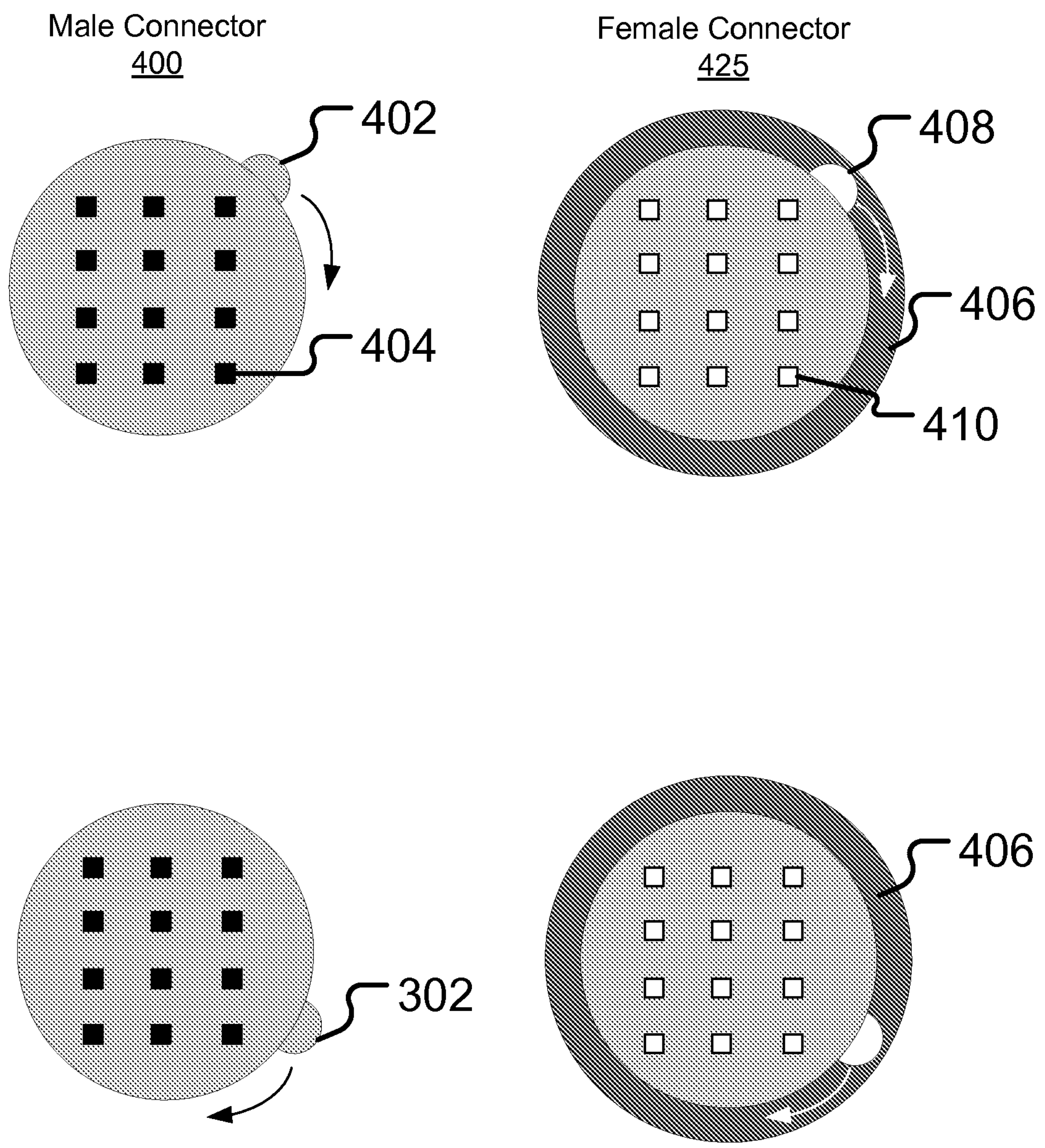
FIG. 4 shows a side view of a male connector device and a female connector device with revolvable key features, consistent with embodiments of the present disclosure.

FIG. 4 shows a side view of a male connector device and a female connector device with revolvable key features, consistent with embodiments of the present disclosure. Aspects of FIG. 4 are directed toward a dynamic keying system with one or more key features 402, 406 including a movable ridge and a movable outer ring to facilitate keying between a male connector device 400 and a female connector device 425.

As shown in FIG. 4, the dynamic keying system can include a male connector device 400 and a female connector device 425. The male connector device 400 can include a key feature 402, and the female connector device can include a key feature 406. Consistent with various embodiments, the key feature 402 can be a movable ridge that protrudes from the male connector device 400, and can revolve around the perimeter of the male connector device 400. In certain embodiments, the movable ridge can be locked in place to prevent accidental or involuntary adjustment. Consistent with various embodiments, the key feature 406 can be a movable ring configured to revolve around the perimeter of the female connector 225. The movable ring can include a guide slot 408 for interfacing with the movable ridge on the male connector device 400, and facilitate coupling between the male connector device 400 and the female connector device 425. Further, the movable ring can also be locked in place in a subsequent mode to prevent accidental adjustment.

As shown in FIG. 4, in certain embodiments the male connector device 400 can include an array of connecting members 404. In certain embodiments, the connecting members 404 can be electrical pins configured to interface with an array of receptacle slots 410 located within the female connector device 425.

As an example, in certain embodiments, a user may set the movable ridge to a position at 45 degrees relative to the top of the male connector device 400, and lock the movable ridge in place. Accordingly, the movable ring could also be set to 45 degrees relative to the top of the female connector device 425 and be locked in place. Such a configuration could allow the movable ridge of the male connector device 400 to be received by the guide slot 408 of the female connector device 425, and facilitate coupling between the connecting members 404 of the male connector device 400 and the receptacle slots 410 of the female connector device 425.

Figure 5:
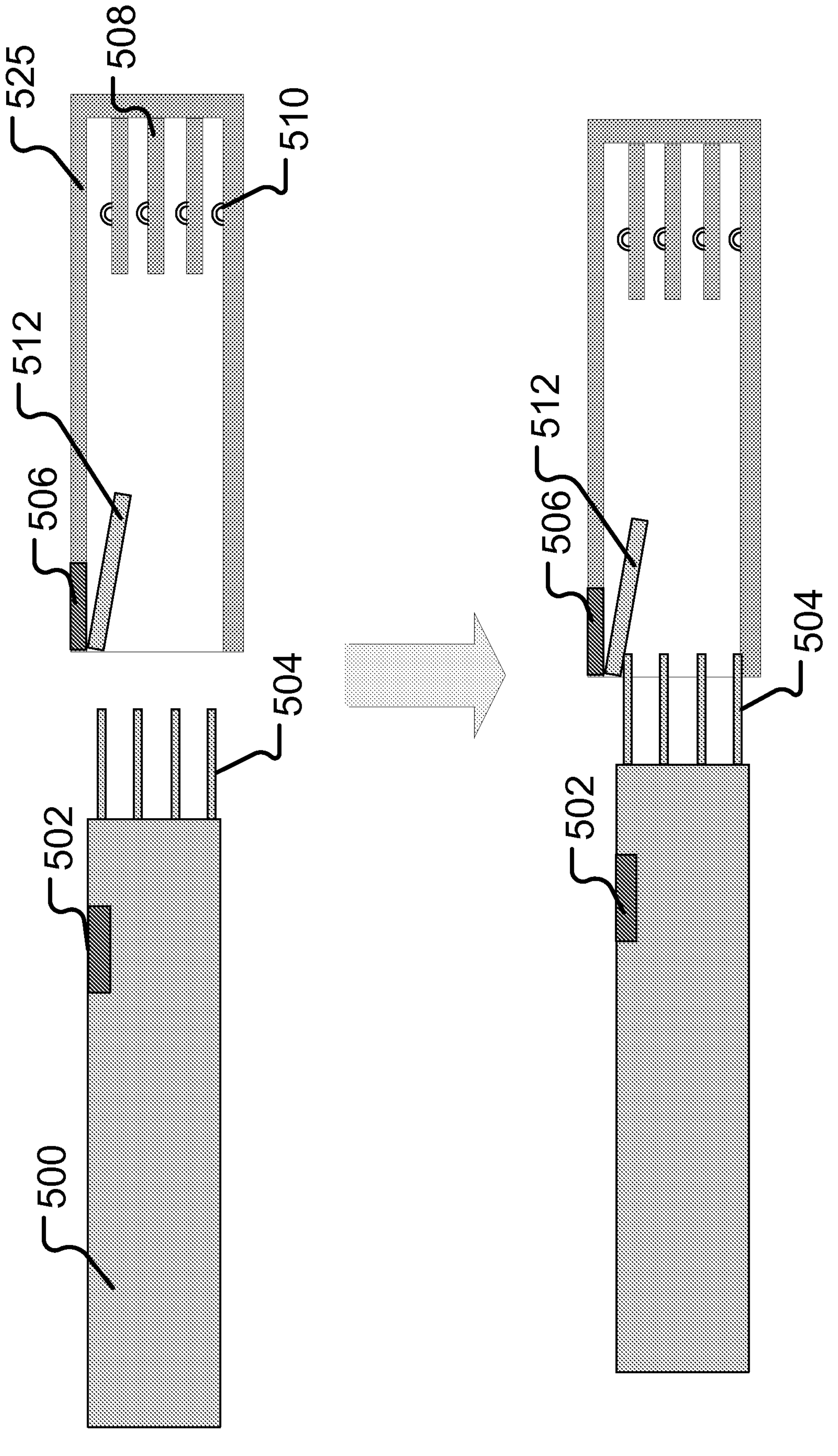
FIG. 5 shows a side view of a male connector device and a female connector device with electronic identification key features, consistent with embodiments of the present disclosure.

FIG. 5 shows a side view of a male connector device and a female connector device with electronic identification key features, consistent with embodiments of the present disclosure. Aspects of FIG. 5 are directed toward a dynamic keying system with one or more key features 502, 506 including an identification bit and an interrogation bit to facilitate keying between a male connector device 500 and a female connector device 525.

As shown in FIG. 5, consistent with various embodiments, the male connector device 500 can include one or more connecting members 504. In certain embodiments, the female connector device 525 can have one or more electrical contacts 510 configured to interface with the connecting members 504. Consistent with various embodiments, the electrical contacts 510 can be located on a support surface 508. In certain embodiments, the support surface 508 can be part of a scaffold structure with parallel arms, each upholding at least one electrical contact 510.

Consistent with various embodiments, the male connector device 500 can include a key feature 502, and the female connector device 525 can include a key feature 506. In certain embodiments, the key feature 502 can be an identification bit, and the key feature 506 can be an interrogation bit. In certain embodiments, the identification bit and the interrogation bit can each include an integrated circuit and an antenna, and be configured to wirelessly communicate with one another. In certain embodiments, the identification bit and the interrogation bit can be a radio-frequency identification (RFID) system based on one of a number of designs. For example, the interrogation bit can be an active-reader passive tag (ARPT) system that transmits an interrogation signal, and the identification bit can be a battery-assisted passive tag (BAPT) system that transmits a user-programmed ID tag in response to the interrogation signal.

Consistent with various embodiments, the male connector device 500 can include non-volatile memory for storing a first ID tag. The first ID tag can be programmed by a user in a first setting of a plurality of settings, and transmitted in response to an interrogation signal from an interrogation bit in a female connector device 525. For example, the first ID tag could be a four digit code set by a user. As another example, in certain embodiments, the first ID tag could be a digital timestamp identifier. In certain embodiments, the female connector device 525 can also include non-volatile memory for storing a second ID tag. In certain embodiments, the female connector device 525 can be configured in an initial mode, in which the female connector device is capable of coupling with a male connector device 500, and the second ID tag is in a standby state. In the standby state, the second ID tag can be configured to automatically program itself in a second setting of a plurality of settings in response to coupling of the female connector device 525 and the male connector device 500. The second setting of the second ID tag can correspond to the first setting of the first ID tag. As an example, the first ID tag could be programmed by a user to be 1234. In the initial mode, upon first coupling with the male connector device 500, the interrogation bit could transmit an interrogation signal. In response to the interrogation signal, the identification bit of the male connector device 500 could transmit its first ID tag of 1234, and the second ID tag could automatically program itself to a corresponding tag matching the first ID tag, such as 1234.

As shown in FIG. 5, in certain embodiments, the female connector device can include a sealing gate 512. In the initial mode, the sealing gate 512 can remain open, and allow for coupling with one or more male connector devices 525. Consistent with various embodiments, in response to programming the second ID tag, the female connector device 525 can enter a subsequent mode. In the subsequent mode, the sealing gate 512 can remain closed, and prevent coupling with at least one male connector device 525. Consistent with various embodiments, when in the subsequent mode, the interrogation bit of the female connector device 525 can be configured to permit coupling with one or more male connector devices 525 that have a first ID tag setting that corresponds to the second ID tag setting of the female connector device 525. For example, in certain embodiments, the female connector device 525 can transmit a radio-frequency interrogation signal. In response, a male connector device 500 in range to receive the interrogation signal can transmit its first ID tag via an identification signal. In certain embodiments, if the first setting of the first ID tag corresponds to the second setting of the second ID tag, then the sealing gate 512 can open to allow for coupling between the female connector device 525 and the male connector device 500.

Figure 6A:
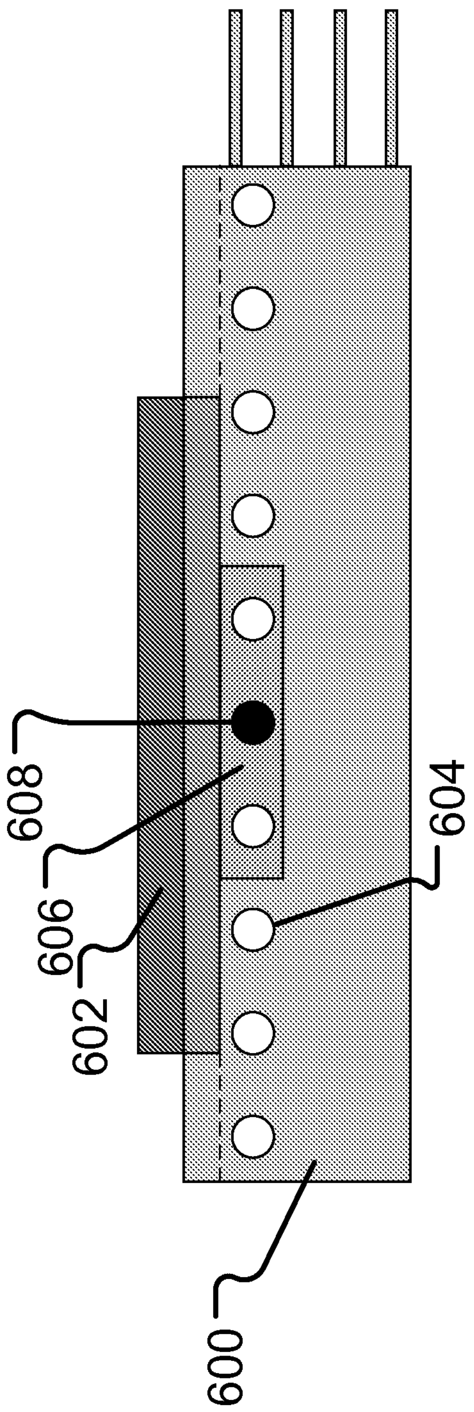
FIG. 6A shows a side view of a male connector device with an exemplary physically adjustable key feature, consistent with embodiments of the present disclosure.
Figure 6B:
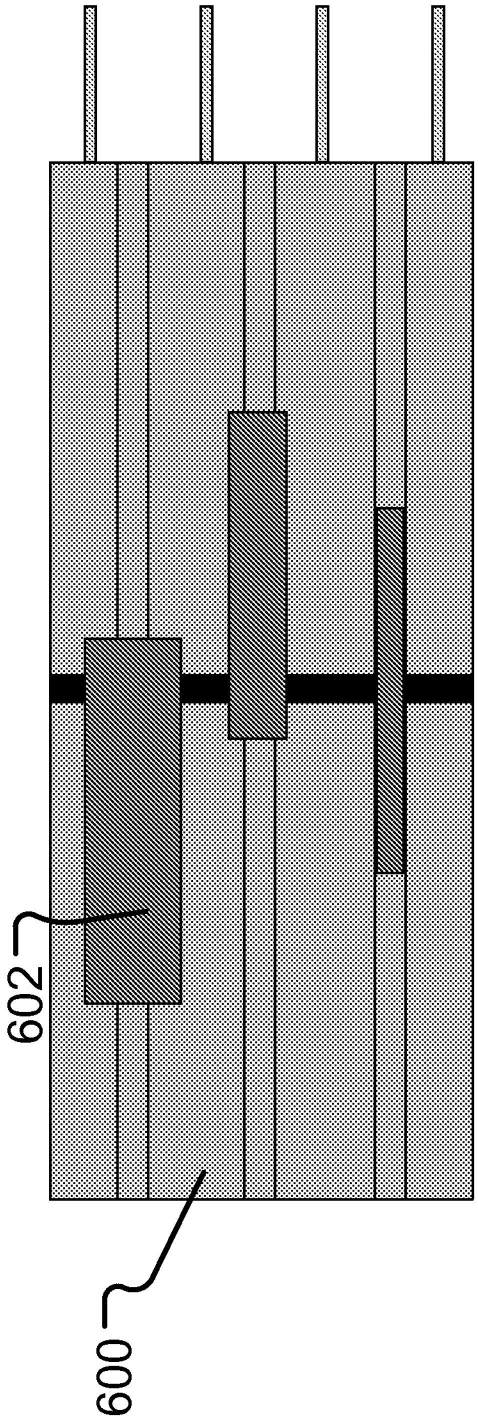
FIG. 6B shows a top view of a male connector device with an exemplary physically adjustable key feature, consistent with embodiments of the present disclosure.

Referring now to FIG. 6A and FIG. 6B, FIG. 6A shows a side view of a male connector device with an exemplary physically adjustable key feature, consistent with embodiments of the present disclosure. FIG. 6B shows a top view of the male connector device with an exemplary physically adjustable key feature, consistent with embodiments of the present disclosure. Aspects of FIG. 6A and FIG. 6B are directed toward a male connector device 600 with an adjustable ridge architecture for customizing a dynamic keying system.

As shown in FIG. 6A, consistent with various embodiments, the male connector device 600 can include an adjustable ridge architecture with one or more ridges 602. Each ridge 602 can be configured to slide forward and backward in a groove 610 located on the male connector device 600. In certain embodiments, the groove can be oriented lengthwise relative to the male connector device 600, as shown in FIG. 6B. A sliding base 606 can be attached to the bottom of each ridge 602, and can facilitate movement of a ridge 602 in a groove 610. Consistent with various embodiments, the body of the male connector device 600 and each ridge 602 can include a plurality of slots located lengthwise relative to the male connector device 600. In certain embodiments, the slots located on the body of the male connector device 600 and each ridge 602 can be spaced so as to align with one another. Consistent with various embodiments, a securing pin 608 can be inserted through the slots of the ridge 602 and the male connector device 600, thereby locking the ridge in place. As shown in FIG. 6B, in certain embodiments, multiple ridges can be adjusted to different positions and locked in place with a securing pin 608. Accordingly, such a solution can allow for customization of the male connector device 600, and facilitate individualized keying between the male connector device 600 and a female connector device. Other solutions are also possible.

Figure 7:
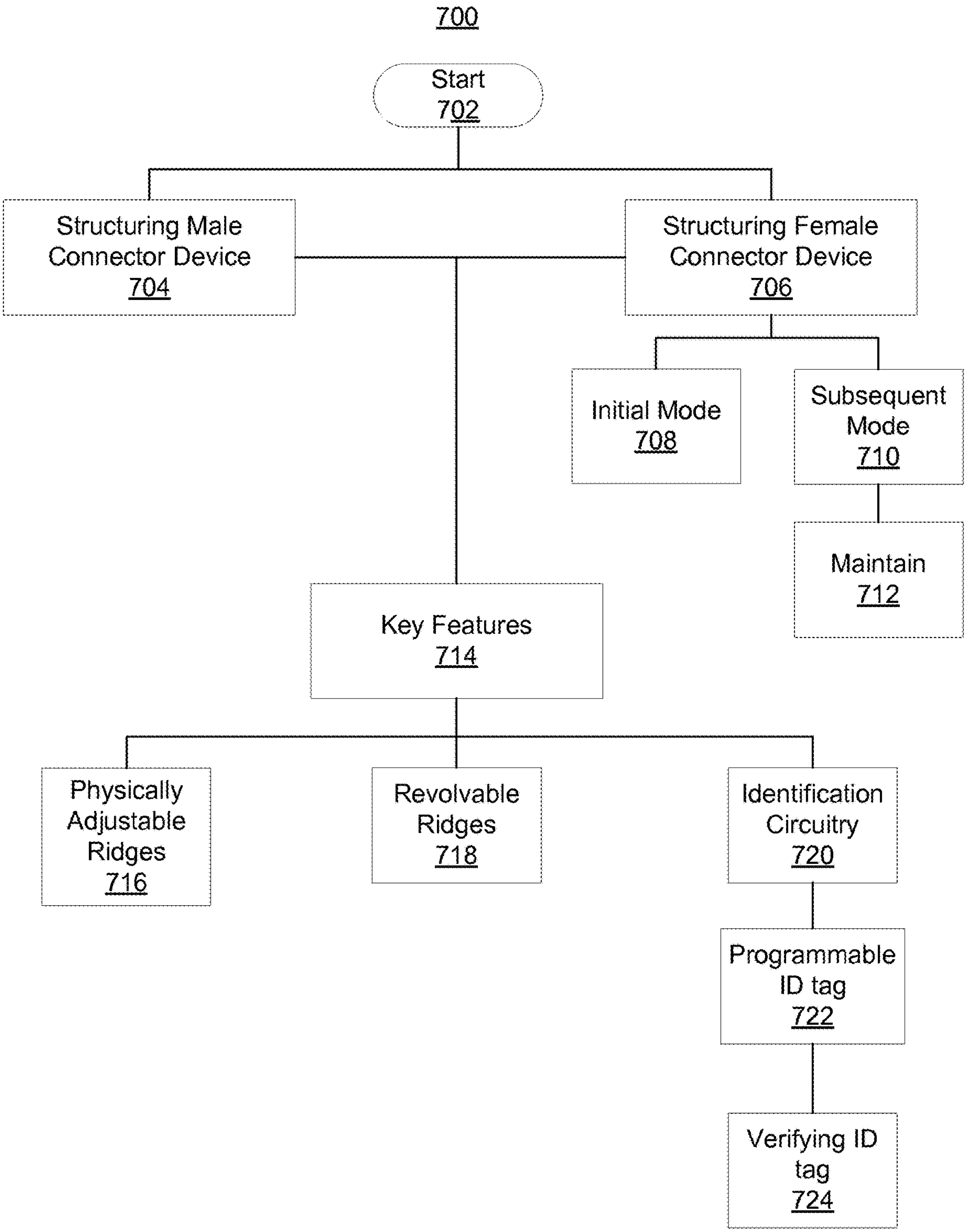
FIG. 7 shows a method of assembling a dynamic keying system, consistent with embodiments of the present disclosure.

FIG. 7 shows a method 700 of assembling a dynamic keying system, consistent with embodiments of the present disclosure. Aspects of FIG. 7 are directed toward structuring a male connector device and a female connector device with one or more key features to facilitate individualized keying between the male connector device and the female connector device. The method 700 may begin at block 702.

Consistent with various embodiments, at block 704 the method 700 can include structuring a male connector device. In certain embodiments, the male connector device can be structured to have a first plurality of settings for one or more key features. For example, in certain embodiments, the key features can include a ridge architecture configurable in a plurality of position settings.

At block 706, the method 700 can include structuring a female connector device. The female connector device can be structured to have a second plurality of settings for one or more key features. For example, in certain embodiments, the key features can include a deformable material configurable in a plurality of settings. As shown in FIG. 7, at block 708, the female connector device can be structured in an initial mode, in which the female connector device is configured to correspond a first setting of the first plurality of settings to a second setting of the second plurality of settings in response to the introduction of a male connector device. At block 710, the female connector device can be structured to have a subsequent mode, in which the female connector device is configured to permit coupling with at least one male connector device having the first setting. Furthermore, in the subsequent mode, the female connector device can consistently deny access to at least one male connector device having a third setting different than the first setting. At block 712, the female connector device can be further configured to, in the subsequent mode, maintain the second setting of the plurality of settings.

At block 714, the male connector device and the female connector device can be structured to have one or more key features. As shown in FIG. 7, in certain embodiments, at block 716 the key features can be structured to include one or more ridges protruding from the male connector device, and be physically adjustable in a first plane relative to the male connector device. For example, the length, width, or height of the ridges could be physically adjusted in a plurality of position settings. Furthermore, the key features can include a receptacle located within the female connector device. The receptacle can be configured to be substantially deformable in the initial mode and substantially non-deformable in the subsequent mode.

At block 718, the key features can be structured to include one or more ridges protruding from the male connector device, and be configured to revolve around the perimeter of the male connector device. Furthermore, the key features can include a receptacle located within the female connector device. The receptacle can be configured to be substantially deformable in the initial mode and substantially non-deformable in the subsequent mode.

At block 720, the key features can be structured to include identification circuitry 720. The identification circuitry can include a first circuitry within the male connector device configured to communicate with a second circuitry and provide a first identification tag in response to an interrogation request from the second circuitry. The second circuitry can be located within the female connector device, and be configured to communicate with the first circuitry and provide an interrogation response. In response to receiving the first identification tag from the male connector device, the second circuitry can verify the identification tag. Furthermore, the key features can be structured to include a gate located at an entrance to the female connector device. The gate can be configured to open in response to verification of the identification tag and allow coupling between the male connector device and the female connector device. In certain embodiments, at block 722, the first identification tag can be programmable in one of a plurality of settings using a code created with a timestamp identifier. Furthermore, at block 724, verifying the first identification tag can be configured to determine whether a first setting of the first identification tag corresponds to a second setting of a second identification tag. In certain embodiments, the second identification tag can be associated with the second circuitry.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

The invention claimed is:

1. A dynamic keying system comprising:

a male connector device having a plurality of connecting members and one or more key features secured to the male connector that include first circuitry that is configurable to define a first plurality of settings; and a female connector device defining a single aperture and having one or more key features that include second circuitry that is configurable to define a second plurality of settings, wherein the female connector device is configured to receive, within the single aperture, each of the plurality of connecting members as well as the one or more key features of the male connector such that the male and female connector devices align the one or more key features of the male connector with the one or more key features of the female connector such that:

the female connector device is configured to, in response to the introduction of the male connector device into the single aperture, correspond a first setting of the first plurality of settings to a second setting of the second plurality of settings; and the female connector device is configured to permit coupling with at least one male connector device having the first setting and consistently deny access to at least one male connector device having a third setting different than the first setting;

wherein:

the first circuitry is configured to communicate with the second circuitry and provide a first identification tag in response to an interrogation request from the second circuitry, the second circuitry is configured to communicate with the first circuitry and provide an interrogation request, and, in response to receiving the first identification tag from the male connector device, verify the identification tag; and a gate located at an entrance to the aperture of the female connector device, the gate configured to open in response to verification of the identification tag and allow coupling between the female connector device and the male connector device.

2. The system of claim 1, wherein the first identification tag is programmable using a code created with a timestamp identifier in one of a plurality of settings.

3. The system of claim 2, further configured to verify the identification tag by determining whether a first setting of the first identification tag corresponds to a second setting of a second identification tag, the second identification tag associated with the second circuitry.

4. The system of claim 1, wherein the female connector device is further configured to, in a subsequent mode, maintain the second setting of the plurality of settings.

5. The system of claim 1, wherein:

the one or more key features of the male connector device include one or more ridges protruding from the male connector device, the ridges configured to be physically adjustable in a first plane relative to the male connector device; and the one or more key features of the female connector device include a receptacle located within the female connector device, the receptacle configured to be substantially deformable in an initial mode and substantially non-deformable in a subsequent mode.

6. The system of claim 1, wherein the male connector includes at least three connecting members and the female connector includes at least three electrical contacts such that each of the at least three connecting members interface with one of the at least three electrical contacts when the female connector receives the male connector.

* * * * *